H. J. COLLIER.
TRACTION AND POWER ATTACHMENT.
APPLICATION FILED JULY 3, 1916.
1,273,035.
Patented July 16, 1918.
3 SHEETS—SHEET 1.
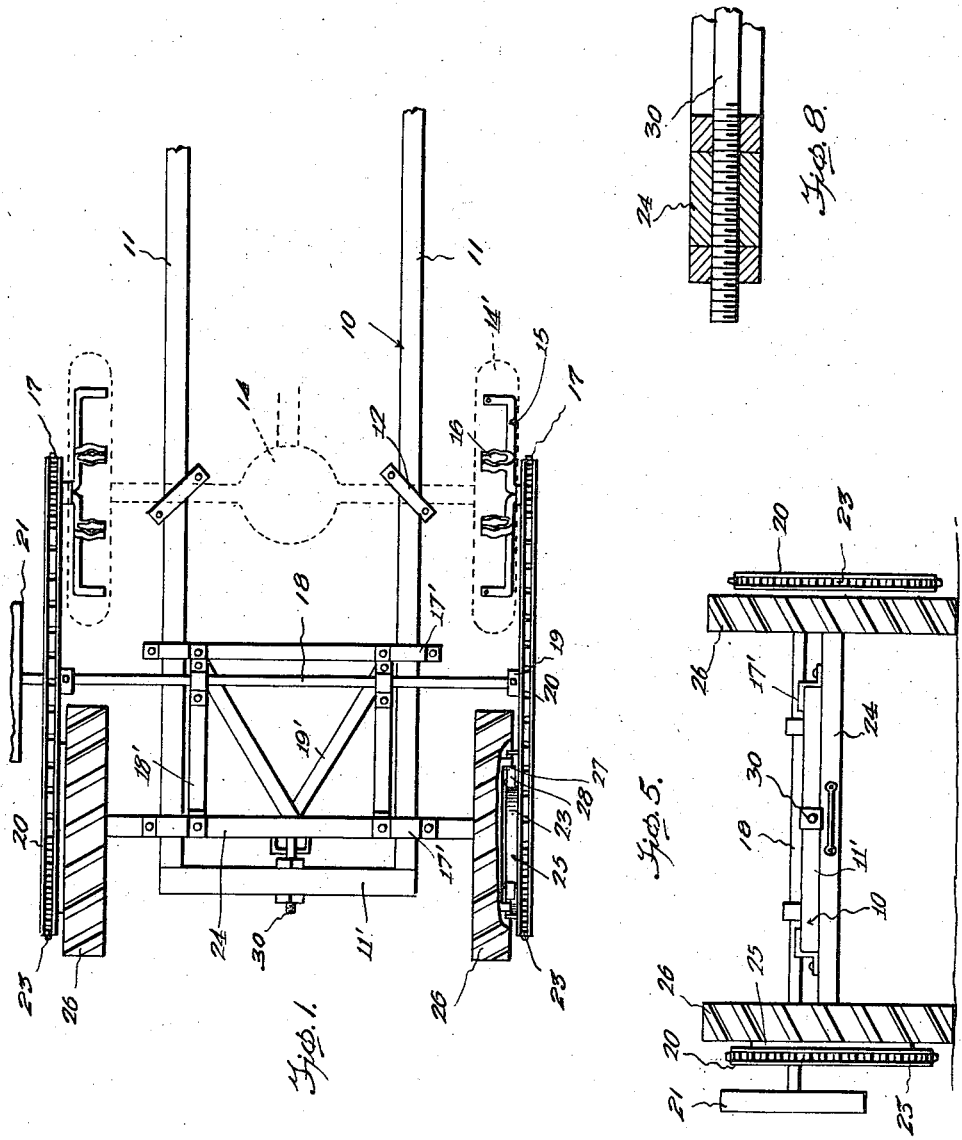
Witness
Paul M. Hunt.
R. M. Roberts.
Inventor
H. J. Collier.
By John Louis Waters & Co.
Attorney H. J. COLLIER.
TRACTION AND POWER ATTACHMENT.
APPLICATION FILED JULY 3, 1916.
1,273,035.
Patented July 16, 1918.
3 SHEETS—SHEET 2.
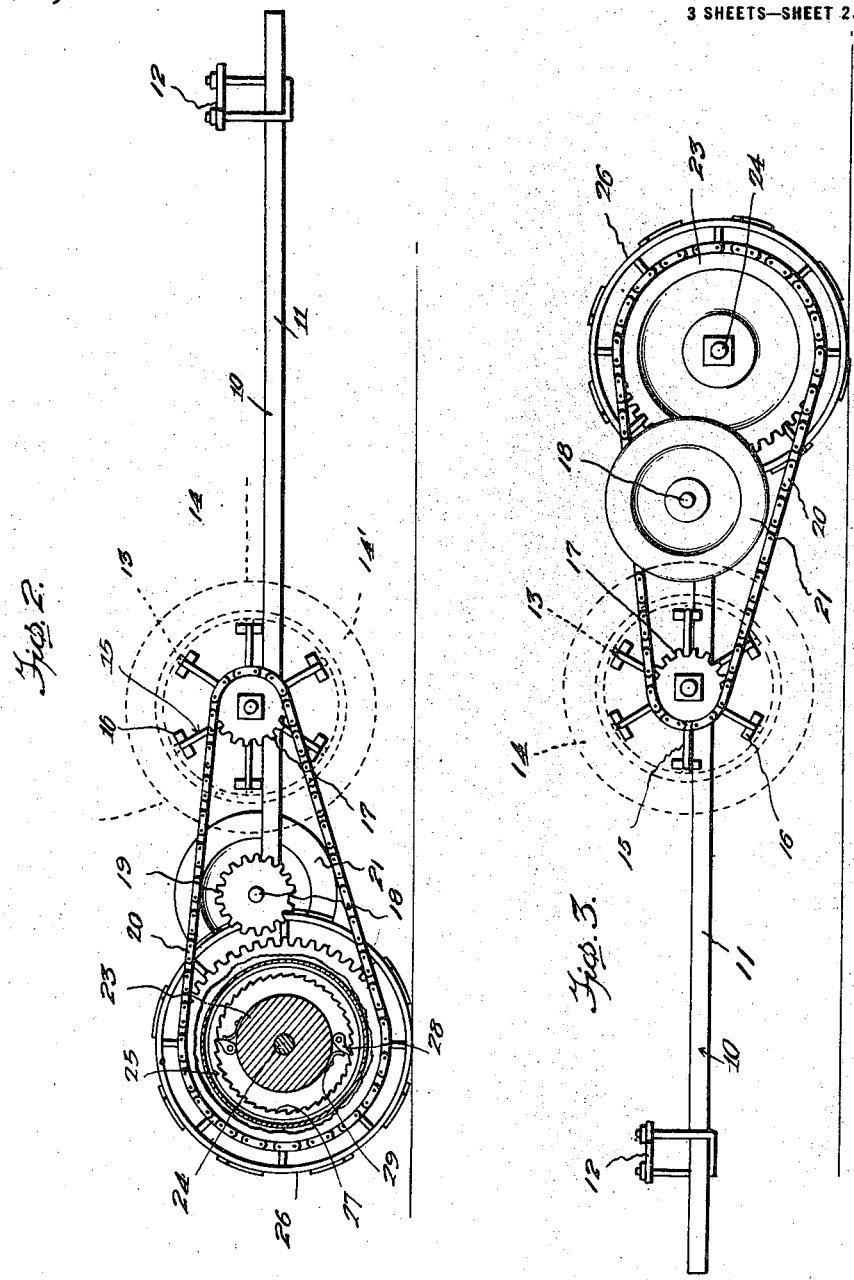

H. J. COLLIER.
TRACTION AND POWER ATTACHMENT.
APPLICATION FILED JULY 3, 1916.
1,273,035.
Patented July 16, 1918.
3 SHEETS—SHEET 3.
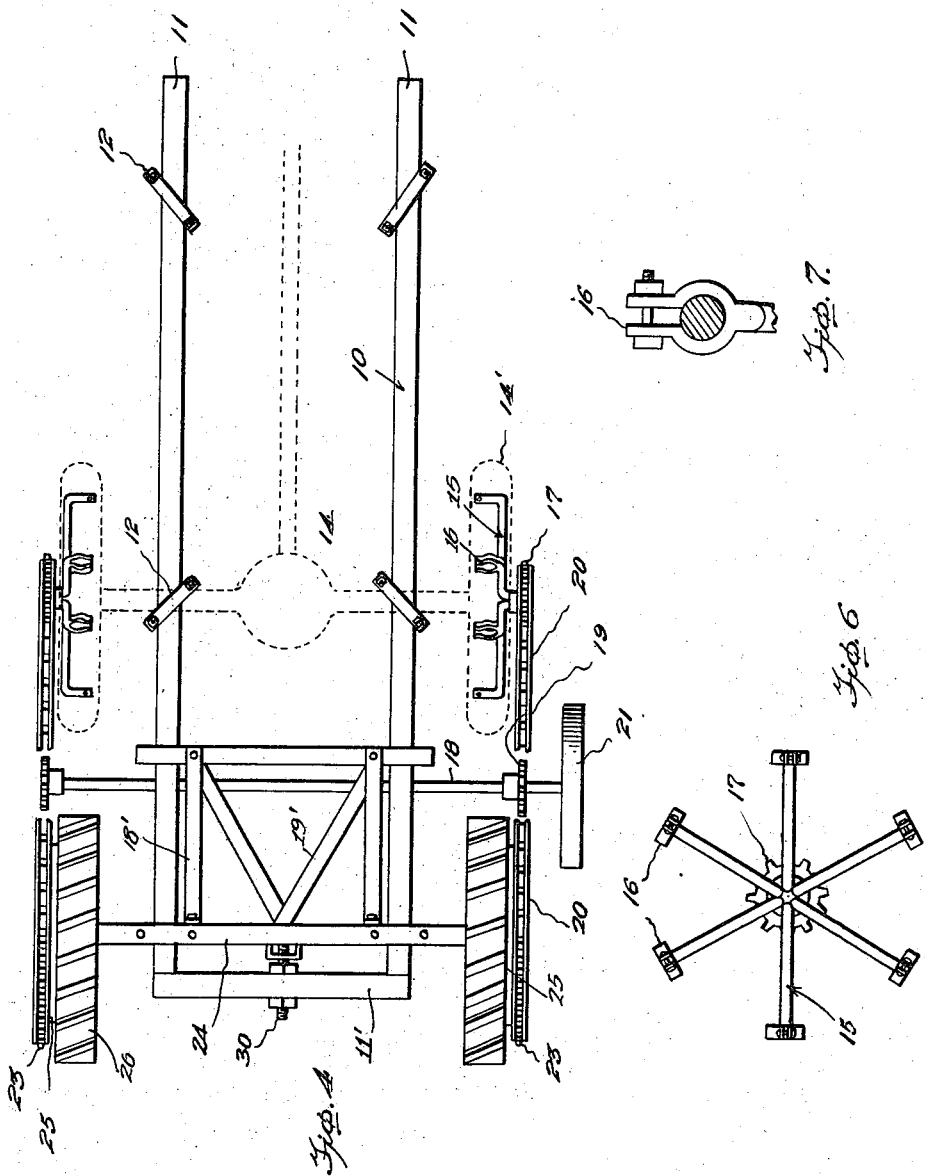
Inventor
H. J. Collier
Witness
By John Louis Waters & Co.
Attorney

UNITED STATES PATENT OFFICE.

HARLEY J. COLLIER, OF DESHLER, OHIO.

TRACTION AND POWER ATTACHMENT.

1,273,035.

Specification of Letters Patent.   Patented July 16, 1918.

Application filed July 3, 1916.   Serial No. 107,371.

*To all whom it may concern:*

Be it known that I, HARLEY J. COLLIER, a citizen of the United States, residing at Deshler, in the county of Henry and State of Ohio, have invented certain useful Improvements in Traction and Power Attachments, of which the following is a specification, reference being had therein to the accompanying drawing.

This invention relates to improvements in traction and power attachments for motor cars, one object of the invention being the provision of means adapted to be attached to the rear of a motor car to receive motion from the rear wheels thereof and to transmit such motion either while the car is stationary or is in motion.

A further object of this invention is the provision of a device of this character which is quickly attached to motor cars now in use, and which will permit said motor car to operate as a traction engine or as a means for transmitting power to operate machinery, and more particularly machinery upon the farm, as for instance, pumps, sawing machines, and the like.

In the accompanying drawings:

Figure 1 is a top plan view of the complete attachment, dotted lines illustrating portions of a motor car chassis.

Fig. 2 is a side elevation thereof.

Fig. 3 is a side elevation taken from the opposite side.

Fig. 4 is a bottom plan view thereof.

Fig. 5 is a rear elevation thereof.

Figs. 6, 7 and 8 are detail views thereof.

Referring now, more particularly, to the accompanying drawings there is provided a main frame 10 embodying side sills 11 and a rear end sill 11', the forward portions of the side sills being adjustably connected by the attaching members 12 to the sides of the chassis 14 of a motor vehicle. Connected to the spokes and rim 13 of the rear wheels 14' of a motor vehicle are spiders 15 each of which embody resilient attaching and clamping arms 16 while carried by each spider is a sprocket wheel 17.

Slidable on the rear portion of the main frame by means of brackets 17' is a rectangular frame 18' reinforced by braces 19'. Journaled in the sides of the auxiliary frame adjacent the forward end thereof is a shaft 18 which carries spaced sprocket wheels 19 over which are trained chains 20 which are also trained about the sprocket wheels 17 so that rotary motion will be transmitted from the sprocket wheels 17 to the shaft 18. A balance or fly wheel 21 is attached to one end of the shaft 18 and upon said shaft is adapted to be mounted power transmitting means so that when the motor vehicle is supported, as shown, with the rear wheels above the ground, the shaft 18 will form a transmitting machine so that power from the motor vehicle may be applied to any desired mechanism.

When the device is used as a tractor, the sprocket chains 20 are trained about the sprocket wheels 17 and about the large sprocket wheels 23 which are journaled in turn on the respective projecting ends of the axle 24, the latter forming the rear end bar of the auxiliary frame 18'. The sprocket wheels 23 are operably connected through mechanism 25 to the tractor wheels 26 which are also journaled on the respective ends of the axle, the mechanism 25 acting as differential gearing to permit of independent or differential movement of the tractor wheels on the axle 24. This mechanism 25 consists of an internal gear 27 on each wheel 26 the teeth of which internal gear are yieldingly engaged by pivoted dogs 28 mounted on the adjacent sprocket wheels 23 and yieldingly held in engagement with the teeth of the internal gear through the instrumentality of springs 29.

As the tractor wheels are of greater diameter than the wheels of a motor vehicle the rear wheels will be supported above and out of contact with the ground, either when the tractor wheels are being operated or when the shaft 18 is operated.

The tractor wheel carrying shaft is attached for longitudinal movement through the adjusting screw 30 which is mounted in the rear sill 11' of the frame and by this means the chains may be tightened after having been placed in position.

From the foregoing description it is evident that the objectionable feature of converting automobiles into tractors is overcome, in that the rear wheels are held above the surface and the tires never engage the same, and when desired, the tires may be removed, as the rear wheels are used merely as a means for transmitting motion to the tractor wheels.

In attaching the present device to a motor vehicle the forward ends of the side sills 11 of the frame, after the vehicle has been jacked up at the rear, are attached to the front and rear axles of the vehicle, the tractor wheels then acting as a support for the jack is released and in maintaining the rear wheels of the vehicle from contact with the ground. The sprocket chains can now be adjusted as an operating device for the tractor and as a power transmitting device.

What I claim as new is:

1. The combination with a motor car, of an attachment therefor including a main frame, means for detachably connecting the forward end of the main frame to the sides of the chassis of the motor car, sprocket wheels, means for detachably connecting the sprocket wheels to the rear wheels of the motor car, an auxiliary frame slidable on the rear portion of the main frame, the rear end bar of which constitutes an axle and has its respective terminals projecting beyond the sides of the main frame, tractor wheels journaled on the respective ends of the axle, sprocket wheels connected for independent movement on the tractor wheels, a shaft journaled transversely in the auxiliary frame, means for transmitting power from the first mentioned sprocket wheels to the last mentioned sprocket wheels and to the shaft, coöperative means connecting the stationary and auxiliary frames for adjusting the auxiliary frame on the stationary frame.

2. The combination with a motor car of an attachment therefor comprising a main frame embodying side sills and a rear end sill, means for detachably connecting the forward portions of the side sills to the sides of the chassis of the motor car, spiders, clamping arms on the ends of the spiders for engagement with the spokes of the rear wheels of the motor car, sprocket wheels carried centrally of the spiders, an auxiliary frame slidably mounted on the rear portion of the main frame the rear cross bar of which constitutes an axle, the opposite ends of the axle projecting beyond the sides of the main frame, tractor wheels journaled on the projecting ends of the axle, other sprocket wheels connected to the tractor wheels to permit of independent relative movement of the tractor wheels, a power transmitting shaft journaled through the auxiliary frame, sprocket chains trained about the first mentioned sprocket wheels and adapted to be trained about the last-mentioned sprocket wheels and operably connected to the power transmitting shaft, and means carried by the axle on the frame and adjustably connected to the rear end bar of the main frame for holding the auxiliary frame in various positions of adjustment.

In testimony whereof I affix my signature.

HARLEY J. COLLIER.